United States Patent [19]

Hoshi

[11] Patent Number: 4,902,911
[45] Date of Patent: Feb. 20, 1990

[54] SEMICONDUCTOR INTEGRATED CIRCUIT HAVING A BUILT-IN POWER VOLTAGE GENERATOR

[75] Inventor: Katsuji Hoshi, Tokyo, Japan

[73] Assignee: NEC Corporation, Tokyo, Japan

[21] Appl. No.: 245,859

[22] Filed: Sep. 19, 1988

[30] Foreign Application Priority Data

Sep. 18, 1987 [JP] Japan ................... 62-234194

[51] Int. Cl.$^4$ ................... H03K 5/01; H03K 3/00
[52] U.S. Cl. ................... 307/296.3; 307/296.1; 307/480; 307/475; 307/264
[58] Field of Search ............... 307/296.1, 296.3, 296.7, 307/296.8, 480, 481, 475, 264

[56] References Cited

U.S. PATENT DOCUMENTS

| | | | |
|---|---|---|---|
| 4,585,955 | 4/1986 | Uchida | 307/475 |
| 4,656,373 | 4/1987 | Plus | 307/475 |
| 4,675,557 | 6/1987 | Huntington | 307/475 |

OTHER PUBLICATIONS

M. P. Concannon et al., "Regulated On-Chip Supply Voltage Source for MOSFET Integrated Circuits", IBM TDB vol. 24, No. 9, Feb. 1982, pp. 4668-4669.

Primary Examiner—John Zazworsky
Attorney, Agent, or Firm—Sughrue, Mion, Zinn, Macpeak & Seas

[57] ABSTRACT

A semiconductor integrated circuit having a voltage generator circuit for generating an internal power voltage lower than an externally supplied power voltage, a control circuit for generating at least one control signal and a functional circuit operating with the internal power voltage and controlled by the control signal is disclosed and featured in that the control circuit includes a first circuit operating with the externally supplied power voltage and generating a first signal with a predetermined timing relationship with respect to an input control signal thereto and a second circuit operating with the internal voltage and generating a second signal in response to the first signal, as the control signal for the functional circuit.

10 Claims, 3 Drawing Sheets

SEMICONDUCTOR INTEGRATED CIRCUIT HAVING A BUILT-IN POWER VOLTAGE GENERATOR

BACKGROUND OF THE INVENTION:

1. Field of the Invention:

The present invention relates to a semiconductor integrated circuit and, more particularly, to a semiconductor integrated circuit having a voltage generator generating an internal power voltage lower than an externally applied power voltage.

2. Description of the Related Art:

Integration scale of semiconductor integrated circuits has been increased by reducing sizes of circuit elements such as transistors formed therein. As a result of such reduction in sizes of circuit elements, large scale integrated circuits have been realized. For example, for reducing the sizes of MOS field effect transistors, the channel length of MOS transistors has been particularly reduced. In specifically, in the recently announced proto-type 4M-bit DRAMs, MOS transistors having channel length of 1 micron or less were employed.

However, if MOS transistors having such short channel length as 1 micron or less are driven by such high power voltage as the conventional power voltage of 5 volts, the characteristics of the short-channel MOS transistors are likely to be degraded due to hot carriers, resulting in a lowered withstanding voltage. For avoiding the above degradation, it is desirable to drive the short-channel MOS transistors with a lower power voltage than the conventional power voltage (5 volts). From a view point of interface with system outside DRAMs and simplification of power voltage source, however, it is still advantageous to employ the conventional power voltage.

Under the above circumstance, it has been proposed to provide in a semiconductor chip a voltage generator generating an internal power voltage lower than 5 volts used in the conventional power system for driving the reduced-size circuit elements. By the proposed, while the unification of the power voltage with peripheral system is kept, the problem due to the short-channel MOS transistors was solved.

However, current driving ability is also reduced by driving the short-channel MOS transistors with the lower internal power voltage. A clock generator or a delay circuit for producing clocks which is combined in the same chip cannot supply clocks having sufficient current. As a result, switching characteristics, particularly, switching time of the short-channel MOS transistors used for signal processing become unstable. This unstability of the switching characteristics causes another serious problem in a timing signal generator circuit or a delay signal generator circuit which is composed of the reduced-size MOS transistors driven by the internal voltage.

Namely, it is an essential matter in the timing signal generator that current values of currents flowing through a transistor for feeding the power voltage and through a transistor for feeding the ground voltage in a unit of inverters forming the timing signal generator and a ratio of the current values flowing through the above transistors are important parameters to determine a delay or response time of the unit of inverter. However, the reduced-size transistors driven by the internal power voltage cannot produce an accurate amount of current as designed and it is difficult to establish a predetermined ratio between the currents flowing through each of the two transistors forming the inverter.

In other words, fluctuations in current values and ratio of currents flowing through a plurality of transistors are large in those transistors driven by the internal power voltage.

Thus, timing signals generated from the timing signal generator driven by the internal power voltage fail to have an accurate time relationship therebetween. Therefore, it is difficult to regulate operations of a functional circuit accurately by the timing signals generated by the above timing signal generator.

SUMMARY OF THE INVENTION:

It is an object of the present invention to provide a semiconductor integrated circuit having a functional circuit operating reliably with an internal power voltage generated therein.

It is another object of the present invention to provide a semiconductor integrated circuit having a large integrated scale and having a clock generator or delayed signal generator improved for a reliable operation of the semiconductor integrated circuit.

The semiconductor integrated circuit according to the present invention comprises a power voltage terminal for receiving an externally supplied power voltage, a power voltage generator for generating an internal power voltage lower than the externally supplied power voltage from the power voltage terminal, a control signal generating circuit supplied with the externally supplied power voltage and generating a first control signal, an amplitude converter circuit supplied with the internal power voltage and generating a second control signal in response to the first control signal, and a functional circuit operable with the internal power voltage and controlled by the second control signal.

The control signal generating circuit operates with the externally supplied power voltage and the first control signal has an amplitude approximately of the externally supplied power voltage. Since the control signal generating circuit operates with the externally supplied power voltage (the conventional power voltage), the current driving ability of the MOS transistors contained in the control signal generating circuit becomes large to make the switching characteristics thereof stable. Thus, the control signal generating circuit generates the first control signal with an accurate timing relationship with respect to the input signal.

The amplitude converter circuit operates with the internal power voltage and simply converts the first control signal having the amplitude of the externally supplied power voltage into the second control signal having the amplitude approximately of the internal power voltage, in response to the first control signal.

Thus, according to the present invention, a control signal such as a timing signal and a delay signal having the amplitude of the internal power voltage can be generated with an accurate timing relationship by the combination of the control signal generating circuit and the amplitude converter circuit.

BRIEF DESCRIPTION OF THE DRAWINGS

The above and further objects, features and advantages of the present invention will become more apparent from the following detailed description taken in conjunction with the accompanying drawings, wherein.

DETAILED DESCRIPTION OF THE INVENTION

A semiconductor integrated circuit in the prior art will be explained with reference to FIG. 1.

A voltage generator circuit 1, a control signal generator 2 and a functional circuit 3 are formed on a semiconductor chip to form an integrated circuit. The voltage generator circuit 1 receives an externally supplied voltage Vcc of 5 volts as well as a ground voltage to generate an internal power voltage $V_A$ (e.g. 3 volts) lower than the externally supplied voltage Vcc. The control signal generator 2 receives the internal power voltage $V_A$ as its power source and generates timing control signals $\phi_1$ and $\phi_2$ in response to an input control signal $\phi_c$ which is externally supplied. The control signal generator 2 includes a plurality of P-channel MOS transistors TP1 to TP5 and N-channel MOS transistors TN1 to TN5 which form 5 stages of CMOS inverters connected in cascade. The timing control signal $\phi_1$ is generated from the second stage of inverter (TP2, TN2) and the timing control signal $\phi_2$ is generated from the fourth stage of inverter (TP4, TN4). Therefore, when the input control signal $\phi_c$ is activated, the timing control signal $\phi_1$ is generated after a first delay time and the timing control signal $\phi_2$ is then generated after a second longer delay time from the activation of the input control signal $\phi_c$. An output ($\phi_3$) of the fifth stage of inverter (TP5, TN5) may be applied to the functional circuit or other circuits, if necessary.

The functional circuit 3 operates with the internal power voltage $V_A$ under control by the timing control signals $\phi_1$ and $\phi_2$ to perform a predetermined operation on an input signal supplied at an input terminal IN. A result of the operation is outputted to an output terminal OUT. The functional circuit 3 includes a large number of small-size transistors and the transistors contained in the control signal generator 2 are also small in size. This is the reason why the internal power voltage $V_A$ is applied to the control signal generator 2 and the functional circuit 3.

Figure 1:
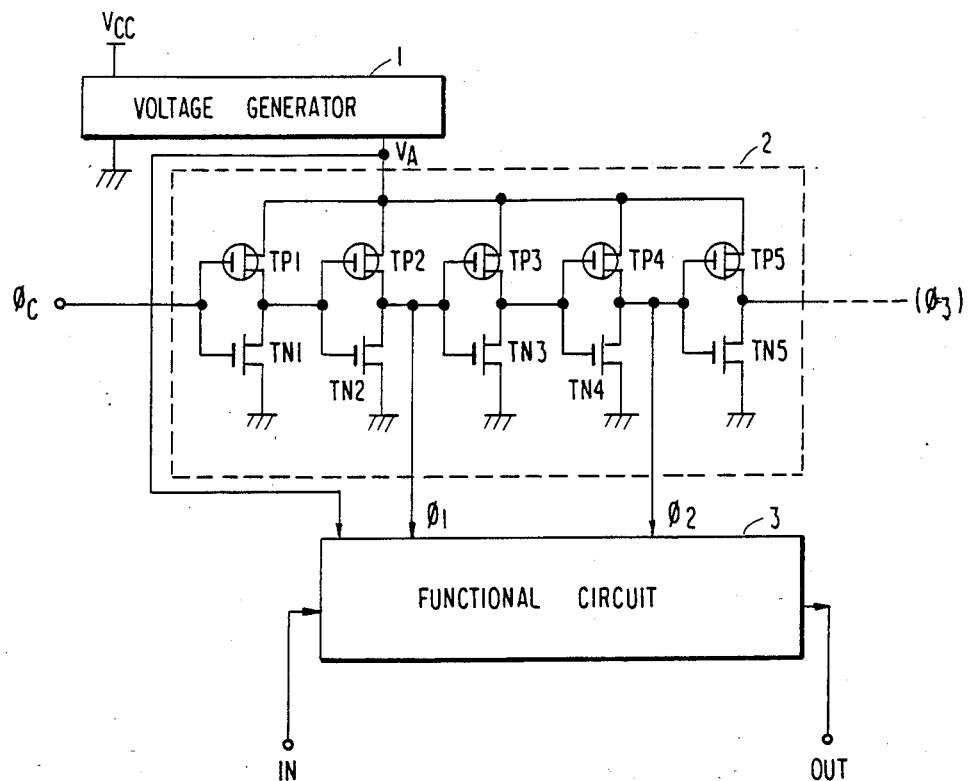
FIG. 1 is a schematic block diagram showing an integrated circuit in the prior art.

However, in the integrated circuit of FIG. 1, the transistors (TP1 - TP5, TN1 - TN5) forming the control signal generator 2 are small in their sizes or dimensions, and particularly channel length thereof is very short (e.g. 1 micron or less) and those transistors are driven by the internal power voltage $V_A$. Therefore, effective current driving ability of those transistors is limited and small, and those transistors are likely to have insufficient current driving ability. Thus, desirable switching characteristics of those transistors cannot be obtained as intended. This causes unstability of time relationship among the input control signal and the timing control signals $\phi_1$ and $\phi_2$, and it is difficult to generate the timing control signals $\phi_1$ and $\phi_2$ with predetermined delay times with respect to the input control signal $\phi_{IN}$. As a result, the timing control signals $\phi_1$ and $\phi_2$ are not adequately generated so that the functional circuit makes mulfunctions.

Figure 2:
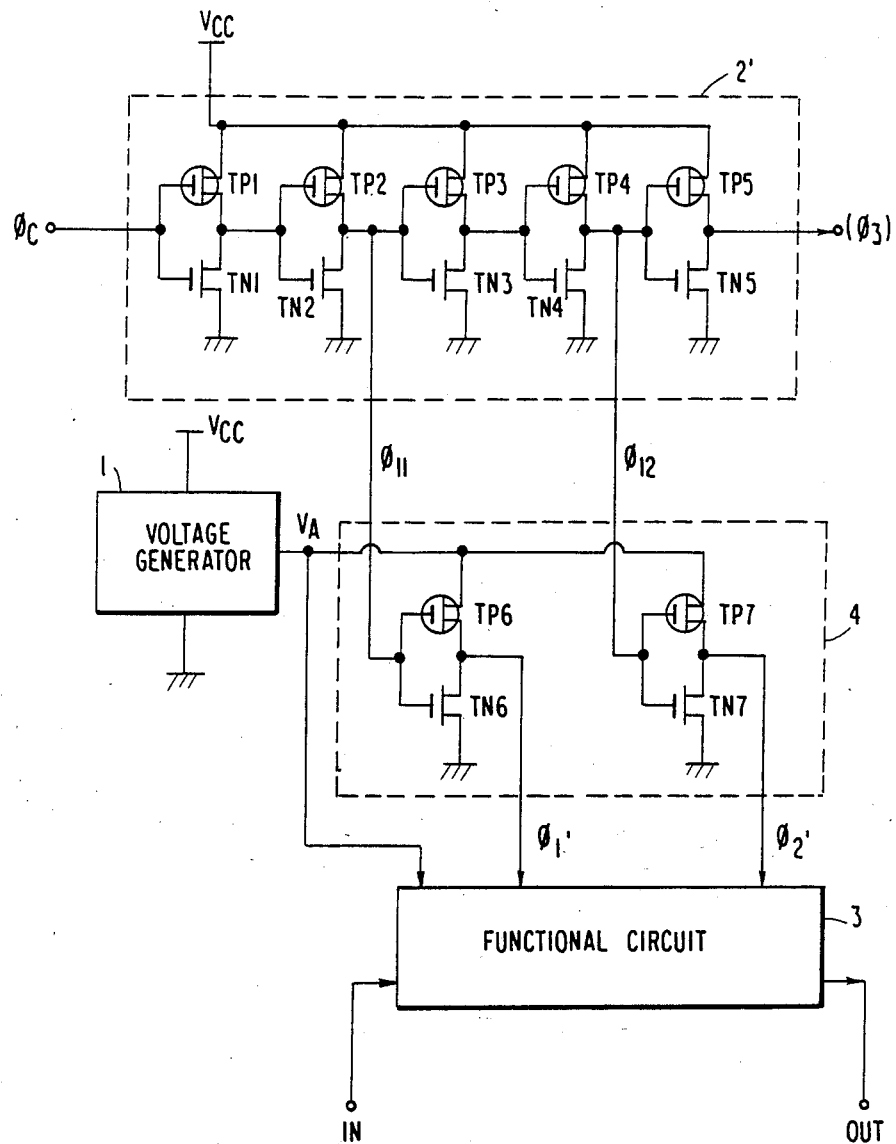
FIG. 2 is a schematic block diagram showing an integrated circuit according to one embodiment of the present invention.

With reference to FIG. 2, an integrated circuit according to one embodiment of the present invention will be explained.

In FIG. 2, elements or portions corresponding to those in FIG. 1 are denoted by the same or similar references.

The present embodiment is obtained by employing a control signal generator circuit 2' operating with the externally supplied power voltage Vcc and an amplitude converter circuit 4, in place of the control signal generator circuit 2 of FIG. 1.

The control signal generator 2' includes a plurality of P-channel transistors TP1 to TP5 and a plurality of N-channel MOS transistors TN1 to TN5 which have a larger size of channel length than those used in other amplitude converter circuit 4 and functional circuit 3 forms CMOS inverters operating with the externally supplied power voltage Vcc (5 volts), and timing signals $\phi_{11}$ and $\phi_{12}$ are generated from the second and fourth stages of inverters, respectively. The timing signals $\phi_{11}$ and $\phi_{12}$ have an amplitude of the power voltage Vcc and a swing between the ground voltage and the power voltage Vcc. The input control signal $\phi_c$ also has the amplitude of Vcc to effectively drive the first stage of inverter. Those transistors contained in the control signal generator circuit 2' are required only to withstand the externally supplied power voltage Vcc.

Since the transistors (TP1 - TP5, TN1 - TN 5) forming the circuit 2' are driven by the externally supplied power voltage Vcc, those transistors are fully driven to have large current driving ability. Thus, those transistors in the circuit 2' provide desirable switching characteristics and the timing signals $\phi_{11}$ and $\phi_{12}$ are generated with desirable timing relationship with respect to the input signal $\phi_c$.

However, the functional circuit 3 operates with the internal power voltage $V_A$ generated by the voltage generator circuit 1. Therefore, it is not desirable to apply the timing signals $\phi_{11}$ and $\phi_{12}$ directly to the functional circuit for controlling it. The amplitude converter circuit 4 is provided in this point of view. Namely, the amplitude converter circuit 4 includes a first inverter composed of a P-channel MOS transistor TP6 and an N-channel MOS transistor TN6 and a second inverter composed of a P-channel MOS transistor TP7 and an N-channel MOS transistor TN7. The first and second inverters operate with the internal power voltage $V_A$ and generate timing control signals $\phi_1'$ and $\phi_2'$ controlling the functional circuit 3, in response to the timing signals $\phi_{11}$ and $\phi_{12}$, respectively. The timing control signals $\phi_1'$ and $\phi_2'$ have the amplitude of the internal power voltage $V_A$ and swing between $V_A$ and the ground voltage so that they control the functional circuit 3 effectively.

In this embodiment, the timing control signals $\phi_1'$ and $\phi_2'$ are the so-called low-active signals, and they assume a low, ground level in response to the activation (high level) of the input control signal $\phi_c$. However, it is a simple design choice to generate the so-called high-active signals that assume the high level in response to $\phi_c$, in place of $\phi_1'$ and $\phi_2'$.

According to the present embodiment, the timing signals $\phi_{11}$ and $\phi_{12}$ are generated with accurate, desirable timing relationship by the circuit 2' operating with the externally supplied power voltage Vcc and then the timing signals $\phi_{11}$ and $\phi_{12}$ are converted into the timing control signals $\phi_1'$ and $\phi_2'$ having the amplitude of the internal power voltage $V_A$.

Therefore, the integrated circuit having the functional circuit which can operate stably under control of timing control signals can be obtained according to the present invention.

Figure 3:
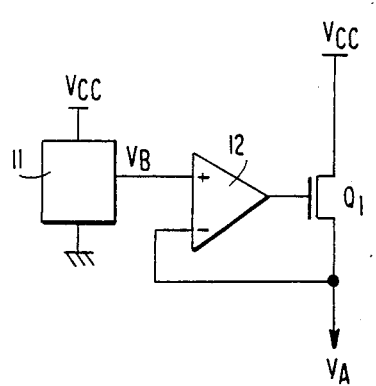
FIG. 3 is a schematic block diagram showing one example of a power voltage generator.

An example of the voltage generator circuit 1 is shown in FIG. 3. As shown in FIG. 3, the voltage generator circuit 1 comprises a bias voltage generating circuit 11 for generating a bias voltage $V_B$ ($0 \leq V_B \leq V_{cc}$), an operational amplifier 12 having a non-inverting input (+) receiving the bias voltage $V_B$ and an inverting input (−), and an N-channel MOS transistor Q1 having a gate connected to an output of the amplifier 12 and a source connected to the inverting input of the amplifier 12. From the source of the transistor Q1, an output voltage "$V_B - V_{TH}$" ($V_{TH}$ being a threshold voltage of Q1) is generated as the internal power voltage $V_A$.

Figure 4:
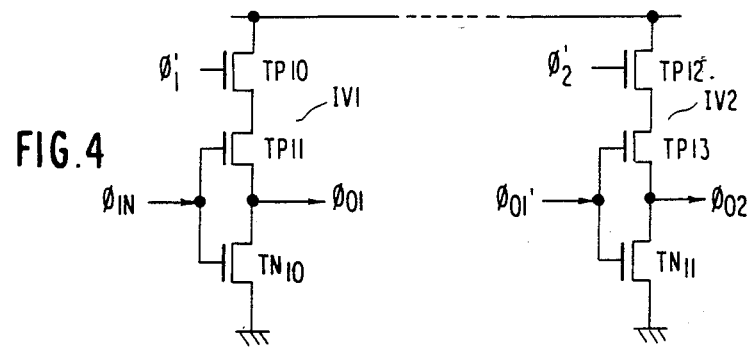
FIG. 4 is one example of a functional circuit in FIG. 2.
Figure 5:
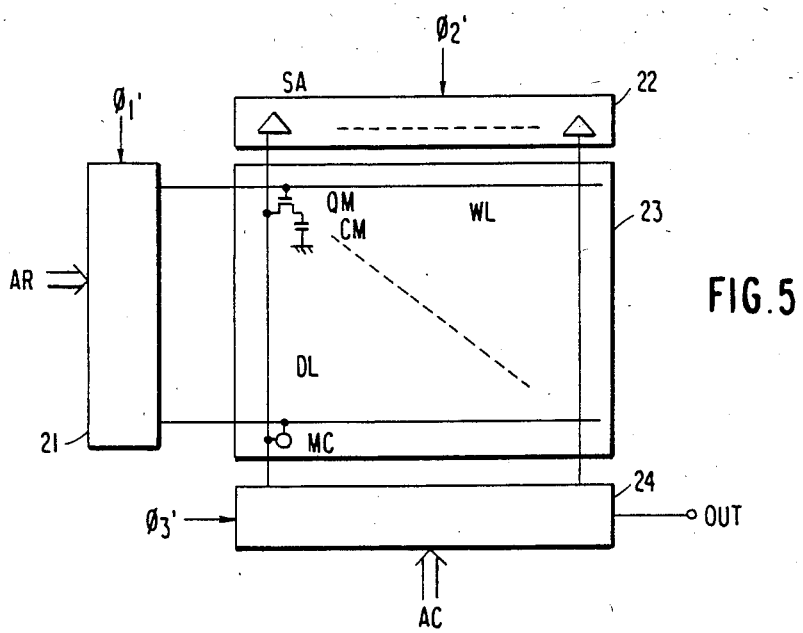
FIG. 5 is another example of the functional circuit in FIG. 2.

Example of the functional circuit 3 will be shown in FIGS. 4 and 5.

The example of FIG. 4 includes a plurality of stages of logic circuits such as inverters and two inverters IV1 and IV2 are representatively illustrated. The inverter IV1 receives an input signal $\phi_{IN}$ which may be the input signal IN or a signal derived therefrom to produce an output signal $\phi_{01}$ in response to the active (low) level of $\phi_1'$. The inverter IV2 receives a signal derived from the signal $\phi_{01}$ and produces a signal $\phi_{02}$ in response to the active (low) level of the timing control signal $\phi_2'$. The transistors TP10 - TP13, TN10, TN11 contained in the functional circuit 3 are smaller than those of the circuit 2'.

The example of the functional circuit 3 shown in FIG. 5 is a memory circuit. The memory circuit mainly comprises a memory cell array 23 having word lines WL arranged in rows, digit lines DL arranged columns, memory cells MC each consisting of a transfer MOS transistor QM and a storage capacitor CM, a row decoder 21 for selecting one of the word lines WL in accordance with row address signals AR, a sense amp block 22 having a plurality of sense amplifiers SA, and a column selection circuit 24 for selecting one of digit lines for accessing thereto in accordance with column address signals AC.

In this memory circuit, the timing control signal $\phi_1'$ is used to enable the row decoder while the timing control signal $\phi_2'$ is used to enable the sense amplifiers SA after the selection of the word line, in a known way. A timing control signal $\phi_3'$ used to enable the column selection circuit 24 is such a signal that is generated after the generation of the timing control signal $\phi_2'$.

Thus, sequential operations in the memory circuit can be performed by the timing control signals such as $\phi_1'$ and $\phi_2'$ accurately.

The present invention has been explained above by way of the embodiment, however, the present invention should not be limited to the above embodiment. For example, bipolar transistors may be employed as transistors and variety circuits may be utilized as the functional circuit.

I claim:

1. A semiconductor integrated circuit comprising:
a first means for receiving an externally supplied power voltage;
a voltage generator circuit coupled to said first means for generating an internal power voltage lower than said externally supplied power voltage;
a second means for receiving a control signal;
a first circuit coupled to said first means and said second means, said first circuit operating with said externally supplied power voltage to generate a first signal after a predetermined time from an activation of said control signal
a second circuit coupled to said voltage generator circuit and said first circuit, said second circuit operating with said internal power voltage to generate a second signal in response to said first signal, said second signal having an amplitude approximately of said internal power voltage; and
a functional circuit coupled to said voltage generator and said second circuit, said functional circuit operating with said internal power voltage and being controlled by said second signal thereby to perform a predetermined function.

2. The integrated circuit according to claim 1, in which said functional circuit includes a memory circuit.

3. The integrated circuit according to claim 1, in which said functional circuit includes a plurality of field effect transistors and said first circuit includes a plurality of field effect transistors.

4. The integrated circuit according to claim 1, in which said voltage generator circuit includes a field effect transistor having a drain receiving said externally supplied power voltage, a bias voltage generator generating a bias voltage, and an operational amplifier having a non-inverting input receiving said bias voltage and an inverting input connected to a source of said field effect transistor, wherein said internal power voltage is generated from the source of said field effect transistor.

5. The integrated circuit according to claim 1, in which said first circuit includes a plurality of first inverter circuits connected in cascade, said first signal being generated from an output of a predetermined one of said first inverter circuits.

6. The integrated circuit according to claim 5, in which said second circuit includes an inverter operating with said internal power voltage to generate said second signal in response to said first signal.

7. An integrated circuit comprising:
a power terminal receiving an externally supplied power voltage;
a voltage generator generating an internal power voltage having a lower voltage than said externally supplied power voltage;
a clock generator driven by said externally supplied power voltage to generate a clock having a first voltage swing of the externally supplied power voltage;
an amplitude converter driven by said internal power voltage to convert said first voltage swing of said clock to a second voltage swing of said internal power voltage;
a functional circuit driven by said internal power voltage to perform a functional operation in response to said converted clock.

8. The integrated circuit as claimed in claim 7, wherein said clock generator is formed of MOS transistors having selected dimensions larger than those used in said amplitude converter and said functional circuit.

9. The integrated circuit as claimed in claim 8, wherein said selected dimensions are channel lengths of the MOS transistors.

10. The integrated circuit as claimed in claim 9, wherein said clock generator generates said clock by delaying an externally applied clock.

* * * * *